United States Patent [19]
Schneider

[11] Patent Number: 5,982,970
[45] Date of Patent: Nov. 9, 1999

[54] PLANAR OPTICAL WAVEGUIDE HAVING A CORE WITH A COATING HAVING A HOLLOW SPACE IN THE COATING AND A METHOD FOR FORMING THE WAVEGUIDE

[75] Inventor: Hartmut Schneider, Munich, Germany

[73] Assignee: Siemens Aktiengesellschaft, Munich, Germany

[21] Appl. No.: 08/934,232

[22] Filed: Sep. 19, 1997

[30] Foreign Application Priority Data

Sep. 19, 1996 [DE] Germany .......................... 196 38 495

[51] Int. Cl.$^6$ ........................................................ G02B 6/02
[52] U.S. Cl. ........................................................ 385/125
[58] Field of Search ................................... 385/122–129, 385/130–132

[56] References Cited

U.S. PATENT DOCUMENTS

| | | | |
|---|---|---|---|
| 3,902,879 | 9/1975 | Siegmund | 385/125 |
| 5,525,190 | 6/1996 | Wojnarowski et al. | 385/125 |

FOREIGN PATENT DOCUMENTS

| | | |
|---|---|---|
| 0 285 351 | 10/1988 | European Pat. Off. . |
| 0 444 582 | 9/1991 | European Pat. Off. . |
| 0285351 | 10/1998 | European Pat. Off. ............... 385/125 |
| 196 38 501 | 9/1996 | Germany . |
| WO 89/08273 | 9/1989 | WIPO . |

*Primary Examiner*—Akm E. Ullah
*Attorney, Agent, or Firm*—Hill & Simpson

[57] ABSTRACT

An optical planar waveguide for conducting an optical radiation along an axis consists of a wave-conducting core that extends along the axis and a coating that extends along the axis and surrounds the core, with the coating having at least one hollow space in the solid material of the coating. The waveguide is preferably made by forming a plurality of layers and by forming recesses in one of the layers, which recesses are covered to create the hollow spaces.

13 Claims, 4 Drawing Sheets

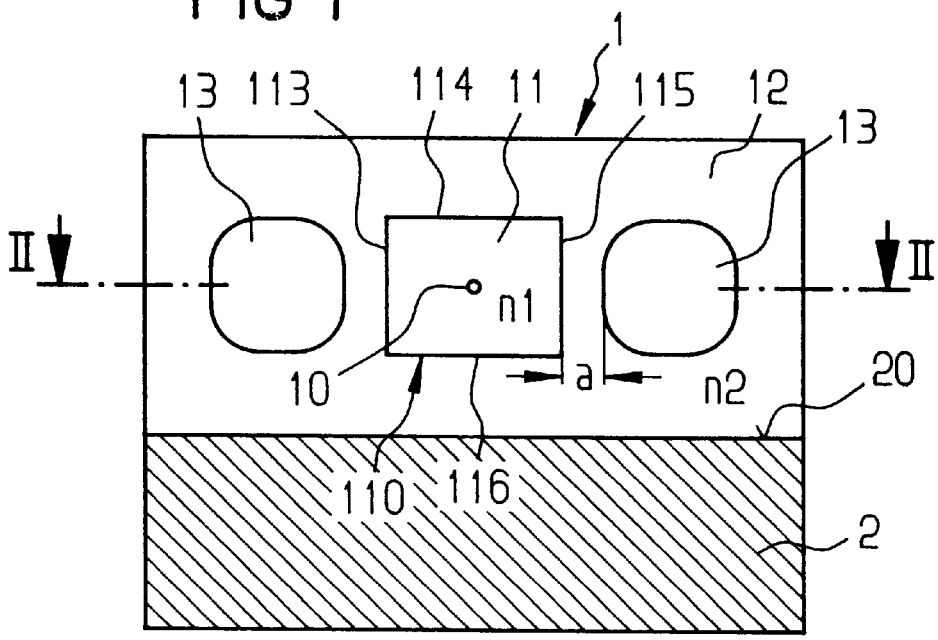
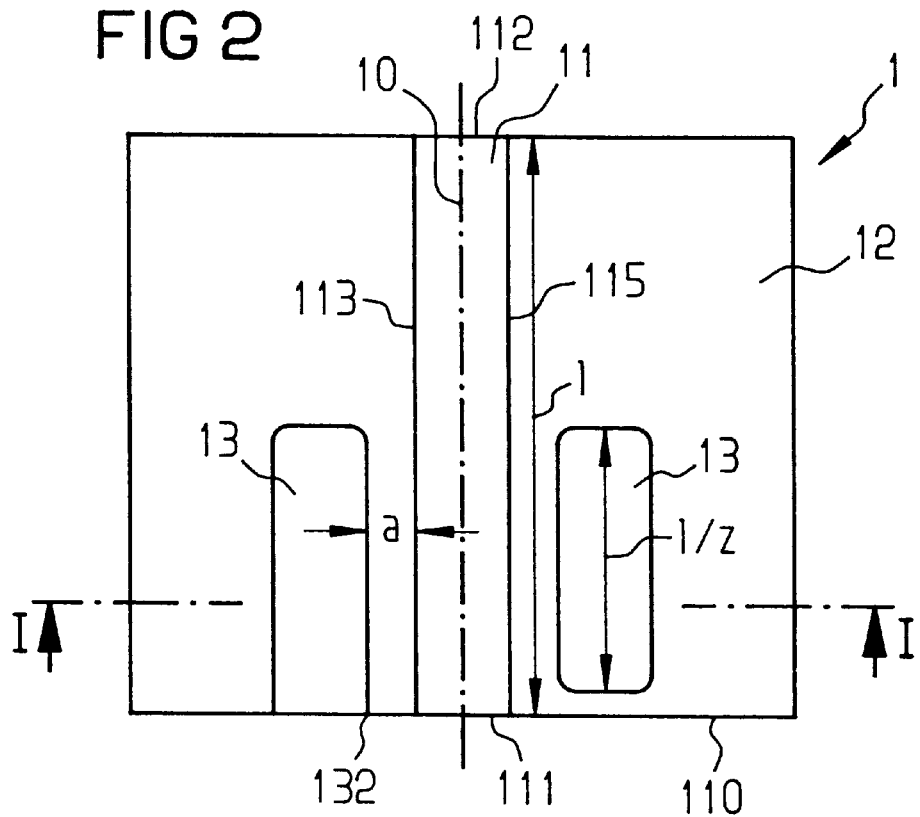

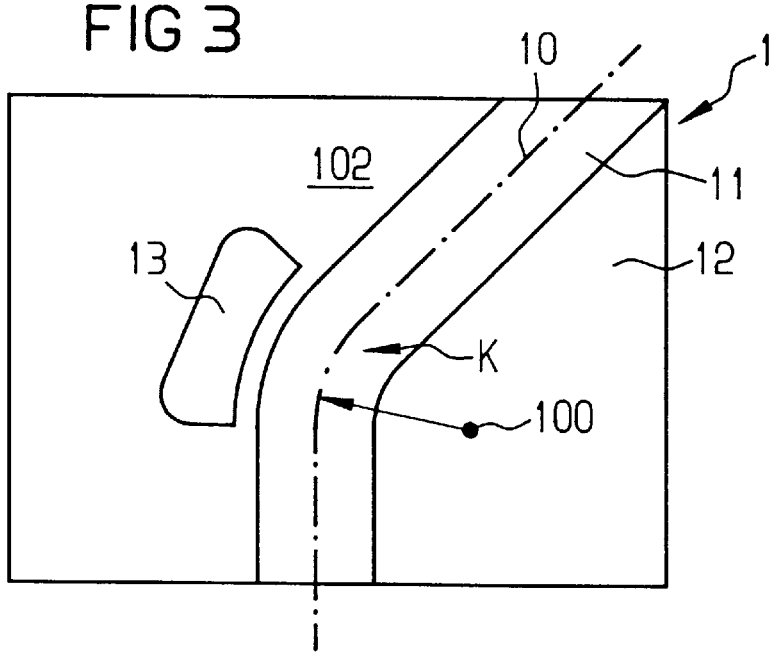
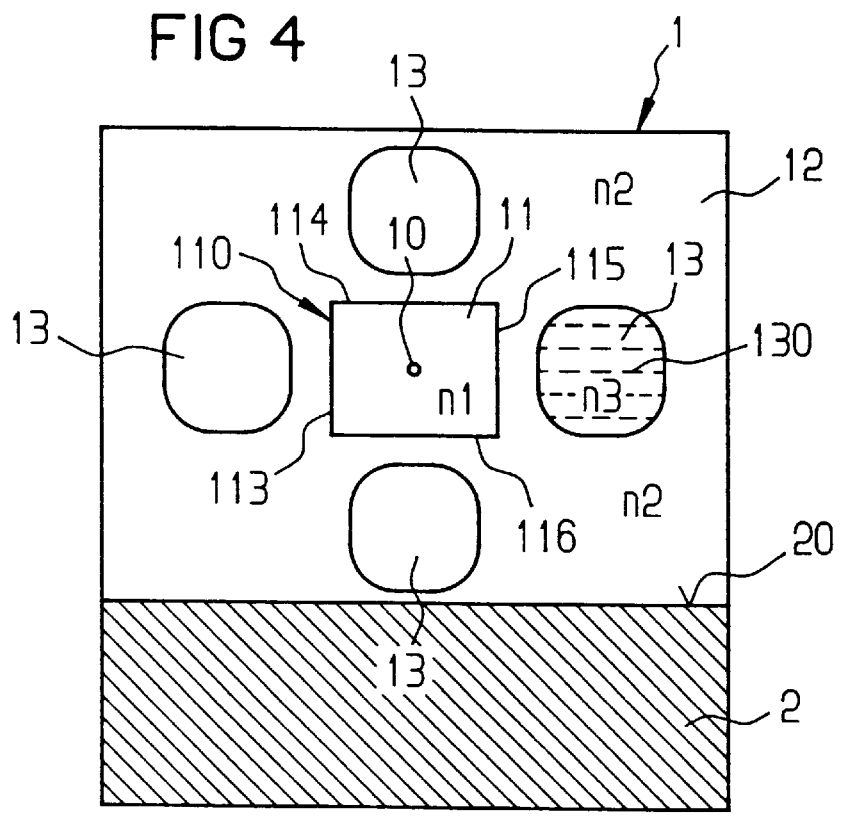

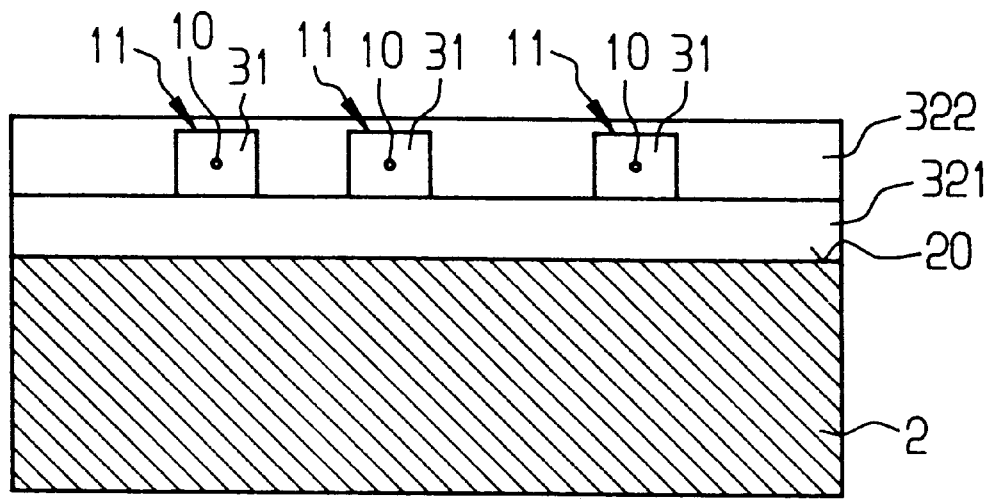
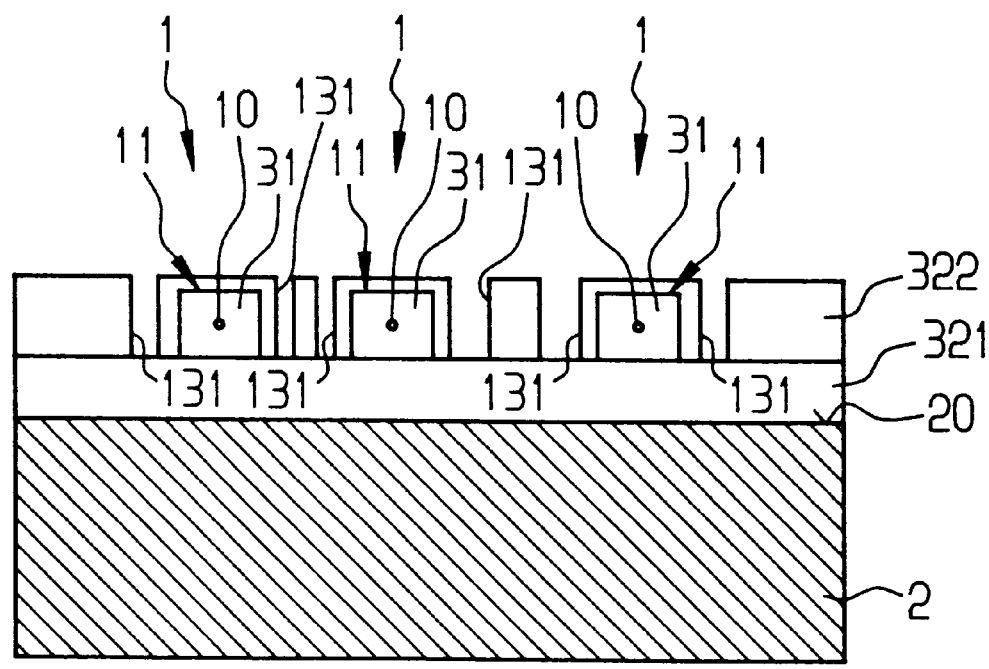

PLANAR OPTICAL WAVEGUIDE HAVING A CORE WITH A COATING HAVING A HOLLOW SPACE IN THE COATING AND A METHOD FOR FORMING THE WAVEGUIDE

BACKGROUND OF THE INVENTION

The present invention is directed to an optical waveguide for conducting an optical radiation along an axis, which waveguide consists of a wave-conducting core extending along the axis made of a material having a first index of refraction and a coating that extends along the axis and surrounds the core made of a solid material comprising a second index of refraction, which is smaller than the first index of refraction of the core.

Waveguides of this type are generally known.

SUMMARY OF THE INVENTION

The object of the present invention is to provide a waveguide, wherein the difference in a refractive index between the core and the coating can be increased given a fixed, predetermined index of refraction for both the core and the coating.

To obtain this object, the present invention is directed to an improvement in an optical waveguide for conducting an optical radiation along an axis consisting of a waveguide-conducting core extending along the axis made of a material comprising a first index of refraction and a coating that extends along the axis and surrounds the core made of a solid material comprising a second index of refraction smaller than the first index of refraction. The improvement includes means in the solid material of the coating including at least one hollow space for reducing the index of refraction of the coating.

By means of the inventive hollow space in the coating of the waveguide, the refractive index of the coating is effectively lowered and the difference in the refractive index between the coating and the core is thereby effectively increased. As a result, the numerical aperture of the waveguide can be considerably increased and the radiation losses of the waveguide, in the case of a curved path, can be reduced considerably.

By means of the increased numerical aperture, couplings between the inventive waveguide and a semiconductor laser are possible without optical lenses. The reduced radiation losses for the curved path of the waveguide enable sharp waveguide curve with a low space requirement, which has previously been realized only with the use of reflectors that could be manufactured with the required precision only at a very high expense.

Although an inventive hollow space can border on the core of the waveguide in the preferred embodiments of the inventive waveguide, the hollow space is arranged at a spacing from the core that is radial to the axis of the core.

An inventive hollow space can extend over the entire axial length of the core of the waveguide, but, in the preferred embodiments, the hollow space is fashioned so that the hollow space only extends along a fraction of the axial length of the core.

Particularly, in waveguides with axes running in a straight line, the construction can preferably and advantageously be such that two or more hollow spaces are distributed over the circumference of the core surrounding the axis.

The inventive waveguide with a strongly increased numerical aperture is advantageously fashioned in such a way that at least one hollow space is arranged at one axial end of the core. The optical radiation is to be coupled-in via this axial end of the core. It is thereby particularly advantageous if, at the axial end of the core, two or more hollow spaces are distributed over the circumference of the core surrounding the axis. Using these measures, the light acceptance from a light-emitting diode can be considerably increased in the waveguide.

In order to reduce the radiation losses in a curved waveguide in which at least a section of the core runs along a curved axis, it is particularly advantageous to arrange a hollow space in the coating only on a side of the axis that is turned away from the center of curvature of the curved axis.

A hollow space can be evacuated; however, it is more preferred to fill it with a fluid, for example a gas. According to a preferred embodiment of the inventive waveguide, at least one hollow space is filled or can be filled with an optically-active medium, for example with an optically-nonlinear fluid. In this case, an optical switch can be advantageously obtained with the inventive waveguide.

The inventive waveguide can also be used advantageously for spectrophotometric analysis. For this purpose, at least one hollow space in the inventive waveguide can be filled with a fluid that is to be analyzed spectrophotometrically, which fluid preferably absorbs. The long optical path in the evanescent field of the inventive waveguide permits a high detection sensitivity.

A hermetic seal of the hollow space of the inventive waveguide will prevent the degradation due to the effects of aging.

Although the invention can be used in all waveguides of the type named above, it is more preferably and more advantageously used in a planar waveguide integrated on the surface of a substrate. The planar waveguides have multiple applications in the field of microoptics. In conventional planar waveguides, the difference in the index of refraction between the core and the coating is on the order of magnitude of about 1%. The numerical aperture of these conventional planar waveguides is, thus, very small and amounts to, at most, 0.30, whereby the coupling efficiency between such a planar waveguide and a laser diode, as a rule, is considerably limited. In addition, sharp bends cannot be allowed in the curves of these planar waveguides, since, otherwise, considerable radiation losses must be accepted.

These limitations can advantageously be removed in a planar waveguide according to the present invention. A particular advantage of the inventive planar waveguide is the considerable increase in numerical apertures due to the lowering of the refractive index of the coating. With an arrangement of several hollow spaces at one axial end of the core of the planar waveguide, the light acceptance from the light-emitting diode can be increased considerably, by which means couplers without lenses can be realized for the optical coupling-together of light-emitting diodes or laser diodes and a waveguide. The radiation converters can also be obtained. The external arrangement of one or more hollow spaces in a curve of the planar waveguide will considerably reduce the radiation losses. The planar waveguide, in particular, can also be obtained as a switch or can be used in a spectrophotometric analysis.

The present invention is also directed to the preferred method for manufacturing the planar waveguide, wherein one or more hollow spaces are distributed around the core by forming recesses or openings in the layers around the core of the waveguides.

Other advantages and features of the invention will be readily apparent from the following description of the preferred embodiments, the drawings and claims.

BRIEF DESCRIPTION OF THE DRAWINGS

FIG. 1 is a cross sectional view taken along the lines I—I of FIG. 2, which cross sectional view extends perpendicular to the axis of the planar waveguide of the present invention;

FIG. 2 is a cross sectional view taken along the lines II—II of FIG. 1 of the inventive planar waveguide of FIG. 1;

FIG. 3 is a longitudinal cross section similar to FIG. 2 of an embodiment of the inventive planar waveguide in accordance with the present invention;

FIG. 4 is a cross sectional view similar to FIG. 1 of another embodiment of the waveguide of the present invention;

FIG. 5 is a cross sectional view similar to FIG. 1 illustrating a planar waveguide structure with three parallel cores with a common coating which serve as the initial stage for manufacturing several waveguides of the present invention;

FIG. 6 is a cross sectional view of the structure of FIG. 5, which illustrates forming a plurality of recesses in a recess layer;

DESCRIPTION OF THE PREFERRED EMBODIMENTS

Figure 7:
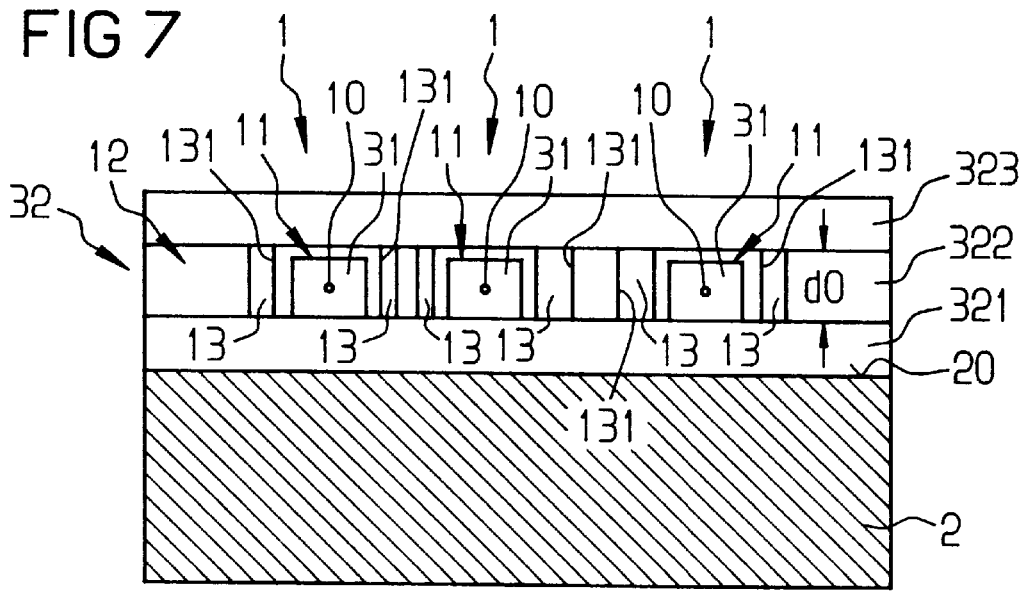
FIG. 7 is a cross sectional view of the next step following the step illustrated in FIG. 6 showing the applying of a final stage with a cover layer.

The principles of the present invention are particularly useful when incorporated in a planar waveguide, generally indicated at 1 in FIGS. 1 and 2.

The planar waveguide 1 is deposited on a surface 20 of a substrate 2 and consists of a coating 12, which is deposited on the surface 20. The waveguide core 11 is provided in the coating 12 and is completely surrounded by this coating. The material of the core 11 has a refractive index n1 and the material of the coating 12 has a refractive index n2, which is smaller than the refractive index n1 of the core 11 so that between the core 11 and the coating 12, there is a difference in the refractive index Δn=n1−n2>0.

The core 11 extends along an axis 10 and an optical radiation (not shown) is conducted in the core 11 along the axis 10. This axis 10 extends perpendicular to the plane of the drawing of FIG. 1. The cross section of the core 11, which is perpendicular to the axis 10, is essentially rectangular in shape. For example, the circumference 110 of the core 11 surrounds the axis 10 and describes a rectangle.

According to the present invention, at least one hollow space 13 is fashioned in the solid material of the coating 12. In the example shown in FIGS. 1 and 2, two hollow spaces 13 and 13a are specifically provided in the coating 12 and are arranged mutually across from each other on adjacent sides 113 and 115 of the circumference 110 of the core 11.

Each of the two hollow spaces 13 and 13a is arranged at a spacing a from the core 11, which can be the same or different for the two hollow spaces. The hollow space can also be constructed to border immediately on the core 11 so that the spacing a of this hollow space would be equal to zero.

In the example according to FIGS. 1 and 2, neither of the two hollow spaces 13 and 13a extends over the entire length l of the core 11, which is bounded by a frontal axial end 111 and a rear axial end 112. While it would be possible for the space to extend the fall length, each extends only a fraction 1/z of the axial length l, wherein z is an arbitrary number greater than one. The number z can be different or equal for different hollow spaces. In the example according to FIGS. 1 and 2, both the spaces 13 and 13a are chosen with different axial lengths so that z>1 but is not equal for both hollow spaces 13 and 13a. In principle, the position of the hollow spaces 13 and 13a, which are shorter than the length l in relation to the core 11, can be arbitrarily chosen.

If the waveguide 1 at one of the two axial ends 111 and 112 of the core 11, for example at the end 111, for an optical radiation that is to be coupled into the core 11 via the end 111 and is to be conducted in the core 11, is supposed to have as high an aperture angle as possible, at least one hollow space 13a is arranged at this axial end. In this case, it is advantageous if two or more hollow spaces 13 are arranged at the axial end 111 in the way shown by the space 13a of FIG. 2. The same holds analogous for the other end 112.

If the axis 10 and, thereby, the core 11 do not run in a straight line as in the exemplary embodiment according to FIGS. 1 and 2 but rather have a curve K, as in the exemplary embodiment of the waveguide generally indicated at 1a in FIG. 3, then for the reduction of the radiation losses in the region of the curvature K, it is advantageous to arrange a hollow space 13b in the region of the curvature. It is, in turn, useful in this case to arrange the hollow space 13b only on the outer side 102 of the curvature K, whereby the outer side 102 is the side of the curvature K that is turned away from a center 100 of the radius of curvature for the curvature K.

The hollow spaces can be hermetically sealed in the coating or can comprise an outward opening, such as the space 13a. In FIG. 2, as an example and without limitations of generality, the hollow space 13a is shown as being open, while, in contrast, the hollow space 13 on the right of the core 11 is shown as hermetically sealed. The open hollow space 13a comprises, for example, an opening 132 in the frontal surface 110a, which contains the end 111 of the core 11 of the waveguide 1. A hermetic seal of the hollow space 13 prevents deterioration due to the effect of aging.

A hollow space 13 can contain a vacuum or, preferably, a fluid, such as a hollow space 13c, which has a fluid 130 (see FIG. 4). Since the hollow spaces 13 serve for the effective lowering of the refractive index n2, predetermined by the solid material of the coating 12, care is to be taken that the fluid 130 comprises a refractive index n3 that is lower than the refractive index n2.

The fluid 130 can be an active medium, for example an optical non-linear fluid, whereby an optical switch can be realized with the inventive waveguide 1b of FIG. 4. The fluid 130 can also be a fluid to be analyzed spectrophotometrically, whereby an inventive waveguide 1b is suited for a spectrophotometric analysis, and a long optical path in the evanescent field of the waveguide 1b permits a high detection sensitivity.

The waveguide 1b according to FIG. 4 differs from the examples of the waveguide 1 according to FIG. 1 in that the hollow spaces 13 and 13c are respectively arranged opposite all four rectangular sides 113, 114, 115 and 116 of the circumference 110 of the core 11, so that the core 11 is surrounded by four hollow spaces.

To manufacture the planar waveguide 1, 1a or 1b of FIGS. 1–4, it is advantageous if the planar waveguide is fashioned as shown in FIGS. 7 and/or 8 in such a way that a strip-type layer 31, which extends along an axis 10 parallel to the surface 20 of the substrate 2, forms the core 11 of the waveguide and is made of a material comprising a refractive index n1 of the core 11. The core is embedded in a stack of layers 32 or 32*a* that form the coating 12 of the core 11 and consist of several layers, each made of a solid material comprising a refractive index n2 of the coating 12.

Figure 8:
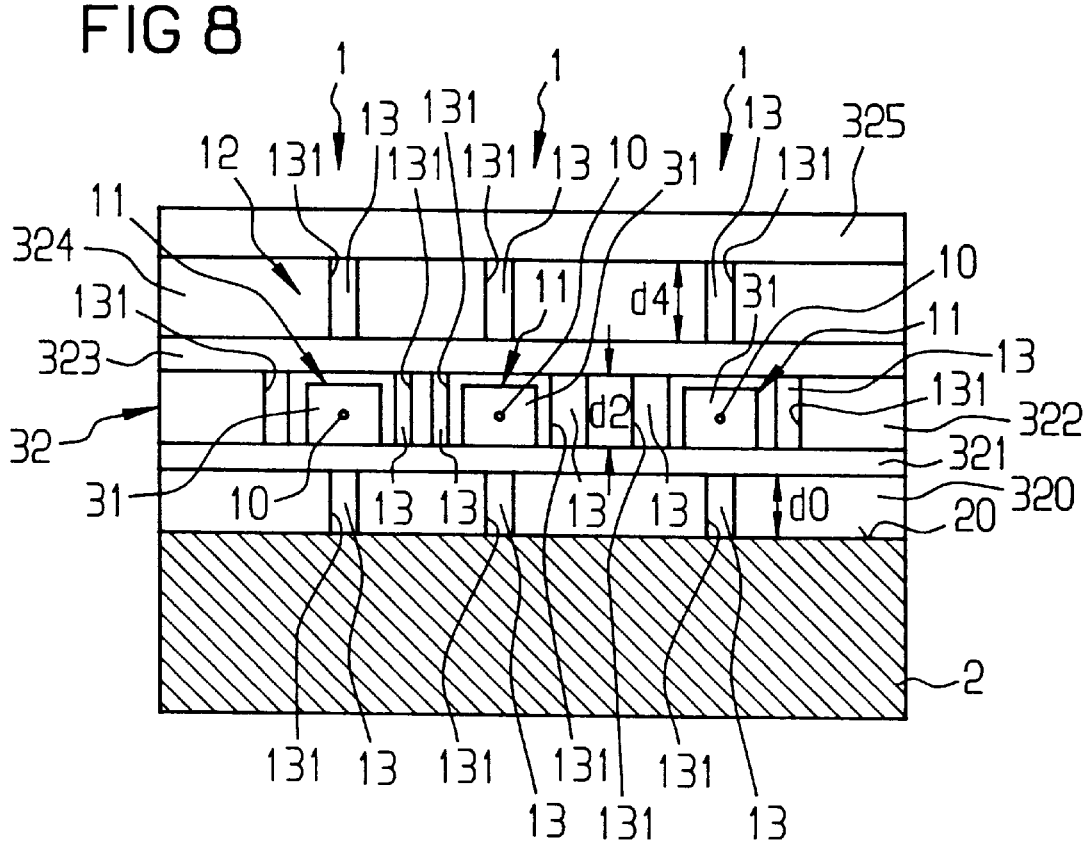
FIG. 8 is a cross sectional view of three inventive planar waveguides in which each of the waveguides has at least four hollow spaces surrounding the waveguide.

The examples according to FIGS. 7 and 8 have the particular advantageous feature that not only one strip-type layer 31 forming a core is embedded in the layer stack 32 that forms the coating 12, but rather several such layers are so embedded, for example three strip-type layers 31 that extend parallel to one another, and each forms a core 11. In this way, three waveguide cores are realized on the surface 20 of the substrate 2, whose cores 11 are surrounded by a common coating 12.

In the example according to FIG. 7, the layer stack 32 forming the common coating 12 consists of the layers 321, 322 and 323 and in the example according to FIG. 8, the stack 32*a* consists of layers 320–325.

The index of refraction n2 of the various layers 321–323 or, respectively, 320–325 of the layer stacks 32 or 32*a* can differ, in which case it is important only that the maximum index of refraction n2 of these layers 321–323 or 320–325 is smaller than the index of refraction n1 of the cores 11.

It is essential that at least one of the layers 321–323 or 320–325 of the layer stack 32 or 32*a* be a recessed layer in which at least one recess, slot or groove 131 defining a hollow space 13 is formed. The recess is covered by an additional layer of the layer stack 32 or 32*a*, which additional layer is deposited on the recess layer on the side turned away from the surface 20 of the substrate 2, thereby forming the inventive hollow space 13.

In the example according to FIG. 7, only the layer 322 of the stack 32 is a recess layer in which recesses 131 are formed. The recesses 131 are covered by the layer 323, which is deposited on the recess layer 322 on the side turned away from the surface 20 of the substrate 2 to create the hollow spaces 13. The construction is thereby specifically made so that the two recesses 131 are, respectively, made in the recess layer 322 for each strip-type layer 31 and the recesses are allocated solely to this strip-type layer 31. In this way, each waveguide according to FIG. 7 is a waveguide 1 according to FIGS. 1 and 2 in which two hollow spaces are distributed over the circumference 110 of the core 11.

In the example according to FIG. 8, the layers 320, 322 and 324 of the layer stack 32*a* are three separated recess layers in which recesses 131 are respectively fashioned. The recesses 131 of the recess layer 320 are covered by a layer 321 that is deposited on this recess layer 320 on the side turned away from the surface 20 of the substrate 2. Each of these recesses 131 will form an inventive hollow space. The recesses 131 of the recess layers 322 and 324 are correspondingly covered by the layers 323 and 325, respectively, and each of these recesses 131 likewise form an inventive hollow space.

The construction is thus specifically made in such a way that in the recess layer 320, a recess 131 is formed under each strip-type layer 31, and in the recess layer 24, a recess 131 is formed over each strip-type layer 31 so that, as in the example according to FIG. 7, in the recess layer 322, two recesses 131 are formed per strip-type layer 31. These two recesses 131 are allocated solely to the strip-type layer 31 and are arranged on both sides of the strip-type layer 31. In this way, each waveguide according to FIG. 8 is a waveguide 1*b* of FIG. 4 in which four hollow spaces in the coating 12 are distributed over the circumference 110 of the core 11.

The embodiments in which three hollow spaces are distributed over the circumference 110 of the core 11 can, for example, be obtained in relation to the example according to FIG. 8 in that either the layer 320 or the layer 324 is omitted or comprises no recesses 131. An embodiment differing from the example according to FIGS. 1 and 2, in which two hollow spaces are distributed over the circumference 110 of the core 11, can be obtained in that, in the example according to FIG. 8, the layer 322 has no recesses 131.

Other distributions of hollow spaces over the circumference 110 of a core 11 can be obtained via different numbers and/or arrangements of recess layers and/or different allocations of hollow spaces to each core 11.

In particular with respect to the type of manufacturing described for the inventive waveguide, it is more advantageous the deeper a recess 131, which defines a hollow space, is made in the recess layer. The recess 131 defining a hollow space usefully extends over the entire thickness of this layer, for example the thickness d0 of the recess layer 320, the thickness d2 of the recess layer 322 or the thickness d4 of the recess layer 324.

An advantageous Method for the manufacture of the example according to FIG. 7 is explained in more detail utilizing FIGS. 5–7, and this method begins with the initial steps shown in FIG. 5.

For the production of the initial step according to FIG. 5, the layer 321 is first deposited on the surface 20 of the substrate 2, and a layer of the material of the core 11 is, in turn, deposited on the layer 321. This second layer is structured, for example, by means of a conventional lithographic method, in such a way that the desired strip-type layers 31, separated from one another, are formed and each defines a core 11 and has an axis 10 extending parallel to the surface 20 of the substrate 2. The axis 10 will determine the longitudinal direction of each of these strip-type layers 31. The layer 322 is deposited on the remaining strip-type layers 31 and on the unexposed surface of the layer 321 between the layers 31 in such a way that a strip-type layer 31 is completely covered. The layer 322 is a recess layer in which recesses or grooves 131 that define hollow spaces 13 are produced in such a way that two recesses 131 are respectively allocated to each strip-type layer 31. The recesses 131 are arranged on both sides of this allocated strip-type layer 31. The manufacturing step shown in FIG. 6 results accordingly and the recesses 131 can be produced by means of a conventional photolithographic process, for example an etching process.

A layer 323 is subsequently deposited on the recess layer 322 comprising the recesses 131 in such a way that the recesses 131 are indeed covered. However, a recess 131 is not completely filled with the material. Instead, the recess 131 forms a hollow space 13, which remains under the cover layer 323.

A similar procedure is used for manufacturing the example according to FIG. 8. Here, the recess layer 320 is first deposited on the surface 20 of the substrate 2. Recesses 131 are produced after the depositing, with each recess 131 being allocated to a core 11 to be produced later in such a way that the core 11 is arranged over the recess 131 allocated thereto in the recess layer 320.

The layer 321 is deposited on the recess layer 320 in such a way that the recesses 131 in the recess layer 320 are indeed covered, but, however, recesses 131 are not completely filled with the material of this layer 321. Thus, each recess 131 will remain as a hollow space 13 under the layer 321.

After the depositing of the layer 321, the layer structure following from FIG. 7 is produced, as described above, with the layer structure consisting of layers 321 and 322 and the strip-type layers 31 embedded between the layers 321 and 322. In this layer structure, the layer 322 is a recess layer comprising the recesses 131, exactly as in the example according to FIG. 7.

On the layer 322 of this layer structure, the layer 323 is deposited in such a way that the recesses 131 in the recess layer 322 are indeed covered, but, however, a recess 131 is not completely filled with the layer material of this layer 323. Thus, recesses 131 will form hollow spaces and remain under the layer 323.

An additional recess layer 324 is provided and a recess 131 allocated above each of the strip-type layers 31 is produced. After the manufacturing of the recesses 131 of the additional recess layer 324, a layer 325 is deposited on this recess layer 324 in such a way that the recesses 131 in the recess layer 324 are indeed covered. However, the recesses 131 are not completely filled and will form the hollow spaces 13 under the layer 325. After forming the layer 325, the final product shown in FIG. 8 is obtained.

For the depositing of the layer on the recess layer comprising a recess 131 in such a way that the recess 131 in the recess layer is covered, but a hollow space remains under the covering layer, the covering layer, for example the layer 321, 323 or, respectively, 325, is advantageously deposited on the recess layer (in the example, the layer 320, 322 or 324) from a gas phase. By means of such a method, it can be ensured that a recess 131 is not loaded with the layer material of the layer to be deposited on the recess layer.

Usefully, not only the layers to be deposited on the recess layers, but each layer of the layer stack 32 or 32a is deposited from a gas phase. It is particularly advantageous if a layer of the layer stack to be deposited from the gas phase is deposited by means of a flame hydrolysis. Flame hydrolysis has proven particularly effective in a method for manufacturing a capillary, which is disclosed in a copending German Application 196 38 501.6 filed Sep. 19, 1996, in which the groove that is fashioned on the surface and defines a capillary is covered with a layer in such a way that the hollow space forming the capillary remains in the groove under the covering layer. As in the present application, recesses or grooves 131 having a width of 2 $\mu$m to 100 $\mu$m can be easily covered.

It is correspondingly advantageous to use a material based on $SiO_2$, preferably consisting of more than 60 mol % $SiO_2$ for each layer of the layer stack 32 or 32a to be deposited by means of a flame hydrolysis or else from a gas phase. In particular, materials based on $SiO_2$ that are doped with at least one material selected from a group consisting of $B_2O_3$, $P_2O_5$, $GeO_2$, $Al_2O_3$, $Ga_2O_3$, $TiO_2$, $ZrO_2$, $ZnO$, $MgO$, $As_2O_3$, $Sb_2O_5$, $Bi_2O_3$ and/or $SnO_2$. Such layers are deposited as porous layers. If such a deposited layer comprises a sufficient thickness of, for example, more than 10 $\mu$m, as well as a high gas viscosity, then, given a careful heating at a temperature of over 900° C. after the depositing, it is possible to sinter the layer into a clear glass so that the overlapped or covered recess is not filled and deeper recesses 131 are more advantageous than ones that are less deep. It is also advantageous to deposit a layer by means of a particle stream from a gas phase, which stream is preferably oriented at a flat angle of 25° to 30° to the surface 20 of the substrate 2.

Given layers of a layer stack 32 or 32 made of a material based on $SiO_2$, the substrate 2 is advantageously made of Si, $Al_2O_3$ and/or a material based on $SiO_2$, since these materials are thermomechanically compatible with the materials of the layer stacks 32 and 32a.

Although various minor modifications may be suggested by those versed in the art, it should be understood that I wish to embody within the scope of the patent granted hereon all such modifications as reasonably and properly come within the scope of my contribution to the art.

I claim:

1. In an optical waveguide for conducting an optical radiation along an axis, said waveguide being a planar waveguide integrated on a surface of a substrate and consisting of a wave-conducting core extending along the axis made of a material consisting of a first index of refraction and a coating that extends along the axis and surrounds the core made of a solid material consisting of a second index of refraction that is smaller than the first index of refraction, the improvement comprising at least one hollow space being provided in the solid material of the coating, the core being a strip-type layer of a solid material having the first index of refraction and extending along an axis parallel to a surface of a substrate, said strip-type layer being embedded in a layer stack that defines the coating of the waveguide and that consists of at least two second layers and at least one recess layer, said second layers and recess layer being of a solid material comprising the second index of refraction, and said recess layer having at least one recess forming the hollow space.

2. In an optical waveguide according to claim 1, wherein the recess layer of the layer stack laterally borders the strip-type layer forming the core.

3. In an optical waveguide according to claim 1, wherein a recess layer is positioned in the layer stack between the strip-type layer and the surface of the substrate and is separated from said strip-type layer by at least one second layer.

4. In an optical waveguide according to claim 1, wherein a recess layer having a recess is positioned on a second layer on top of the strip-type layers defining the core.

5. In an optical waveguide according to claim 1, wherein the recess layer has a recess for defining a hollow space to extend over the entire thickness of the recess layer.

6. In an optical waveguide according to claim 1, wherein at least one layer of the waveguide is made of a material based on $SiO_2$.

7. In an optical waveguide according to claim 6, wherein the material based on $SiO_2$ consists of more than 60 mol % $SiO_2$.

8. In an optical waveguide according to claim 6, wherein the material based on $SiO_2$ is doped with at least one material selected from a group consisting of $B_2O_3$, $P_2O_5$, $GeO_2$, $Al_2O_3$, $Ga_2O_3$, $TiO_2$, $ZrO_2$, $ZnO$, $MgO$, $As_2O_3$, $Sb_2O_5$, $Bi_2O_3$ and $SnO_2$.

9. In an optical waveguide according to claim 1, wherein the layer stack consists of three recess layers, with the middle recess layer receiving the strip-type layer and being separated from the outer two recess layers by the second layers and the outermost recess layer being covered by a second layer.

10. A method for manufacturing a waveguide having a waveguide core of a first index of refraction surrounded by a coating of a material of a second index of refraction, said coating having at least one hollow space, said method comprising the steps of providing a substrate having a surface, providing a stack of layers having a first recess layer being deposited on the surface of the substrate, forming at least one recess in said first recess layer, forming a first layer of the second type on said first recess layer to close each recess, forming a strip-type layer for a core over each recess of the first recess layer, forming a second recess layer on the strip layer, forming at least one recess for each strip-type layer, and providing at least a second layer of the second type to close the recesses of the second recess layer.

11. A method for manufacturing a waveguide having a waveguide core of a first index of refraction surrounded by a coating of material of a second index of refraction, said coating having at lease one hollow space, said method comprising the steps of providing a substrate having a surface, depositing a first layer of the second type on the surface of the substrate, forming strip-type layers for each of the waveguides on said first layer, forming a recess layer covering the strip-type layers, forming at least one recess for each strip-type layer in said recess layer, forming a second layer of the second type on said recess layer to close the recesses so that each waveguide has a covering with at least one hollow space.

12. A method according to claim 10, wherein each layer of the layer stack is deposited from a gas phase.

13. A method according to claim 10, wherein each layer of the layer stack is deposited from a gas phase by means of flame hydrolysis.

* * * * *